INVENTOR.
KARL P. SCHUBERT

INVENTOR.
KARL P. SCHUBERT

United States Patent Office 3,176,553
Patented Apr. 6, 1965

3,176,553
PICK OFF ATTACHMENT
Karl P. Schubert, Cleveland Heights, Ohio, assignor to
The National Acme Company, a corporation of Ohio
Filed July 6, 1962, Ser. No. 207,958
8 Claims. (Cl. 82—38)

The present invention relates in general to a pick off attachment which may conveniently be used with single or multiple spindle automatic type lathes.

In automatic machines of the bar type it is well appreciated that workpiece stock is continuously fed axially through the spindles and various machining operations are performed thereon including cutting a workpiece to length from the stock. It is also desirable in many cases to perform machining operations on the cut off side of the workpiece.

As a result of the above, an object of the present invention is to provide an attachment to hold the outboard end of the workpiece as it is being cut off to provide a burr free cut off. The attachment also provides a holder and drive for machining operations on the cut off side such as back drilling, back milling etc.

Another object of the present invention is to provide a pick off attachment which has a very compact design.

Another object of the present invention is to provide a pick off attachment which includes a rotatable collet type chuck and a collet sleeve coaxial therewith and movable axially by a coaxial non-rotating piston to close the chuck by means of a ball acting on a cam surface on an end of the collet sleeve.

Another object of the present invention is to provide a pick off attachment which includes a means of applying a closing force to the chuck which generally avoids twisting or bending forces on the unit.

Another object of the present invention is to provide a pick off attachment which includes a coaxial cylinder and piston arrangement for exerting a closing force on the collet chuck.

Another object of the present invention is to provide a pick off attachment which has a greatly reduced amount of friction in moving the chuck between open and closed positions.

Another object of the present invention is to provide a pick off attachment which has a construction which permits easy connection to a drive shaft.

Another object of the present invention is to provide a pick off attachment which has a large opening extending therethrough to discharge workpieces when it is not possible to eject workpieces from the front.

Another object of the present invention is to provide a pick off attachment which has a generally non-rotating casing or housing enclosing the unit.

Another object of the present invention is to provide a pick off attachment which includes an axially movable tapered sleeve for engaging a detent which in turn urges a member axially to close the chuck of the unit.

Another object of the present invention is to provide a housing for a non-rotating cylinder and piston to transmit axial force to a coaxially disposed rotating spindle of a pick off attachment.

Other objects and a fuller understanding of this invention may be had by referring to the following description and claims, taken in conjunction with the accompanying drawings, in which:

Figure 1:
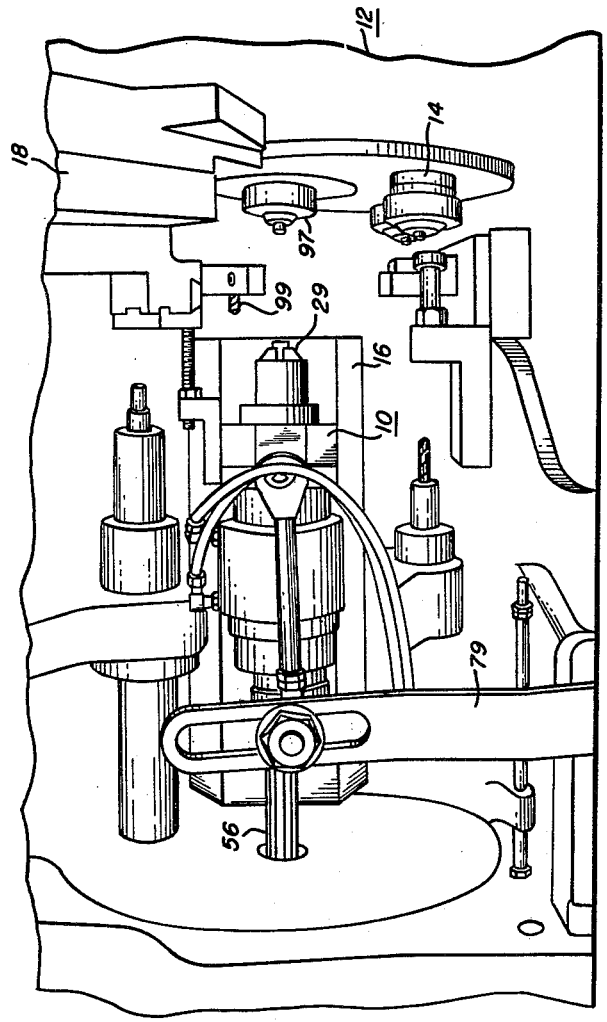
FIGURE 1 is a perspective view of the tooling area of a multiple spindle automatic lathe generally illustrating the environment of the pick off attachment of the present invention.
Figure 4:
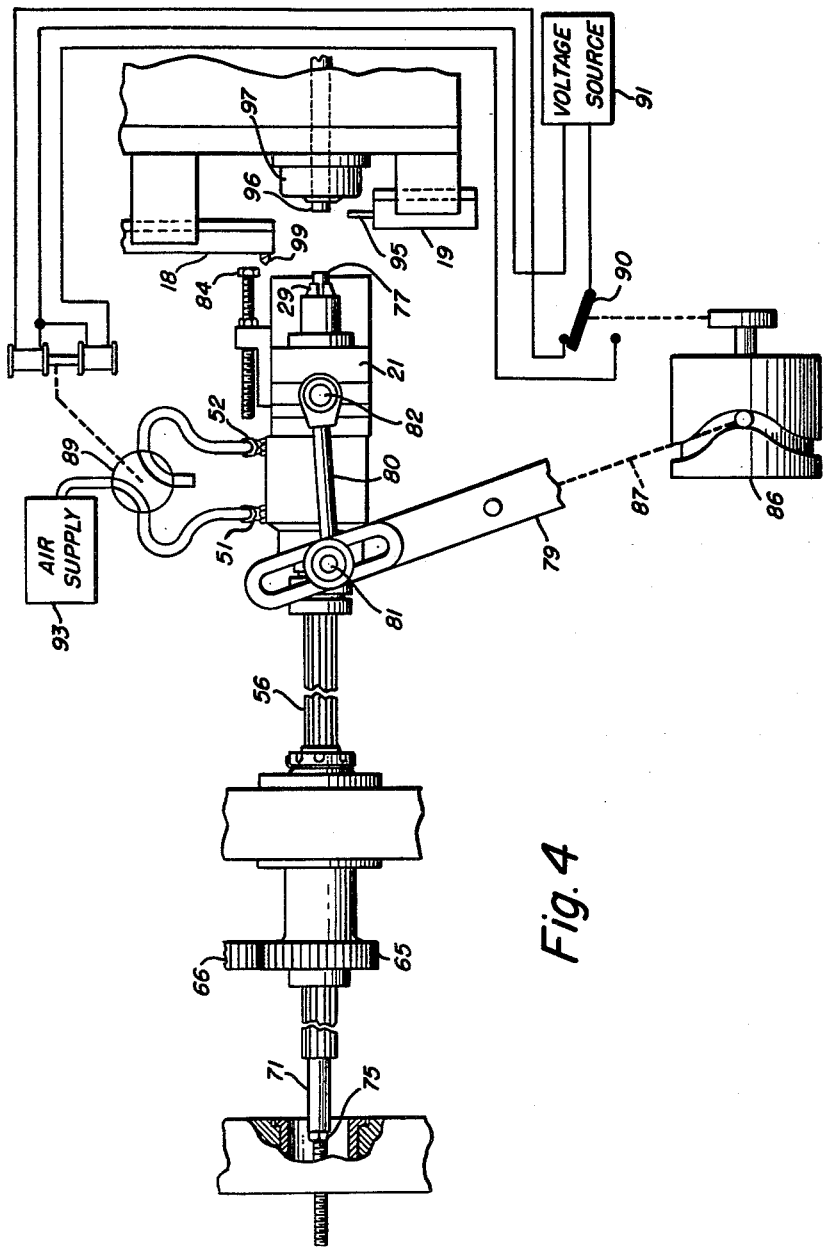
FIGURE 4 is a schematic view generally showing the control circuit which controls the operating movements of the pick off attachment.

FIGURE 1 shows the environment of the pick off attachment illustrated generally by the reference numeral 10 as mounted in the tooling area of a six-spindle automatic lathe, also referred to as a multiple-spindle bar machine 12. The pick off attachment 10 is shown as mounted in what is referred to as the fifth position of the spindle of machine 12, with the sixth position being at 14 and the remaining four positions being located conventionally as is well known by those skilled in the art. The multiple-spindle machine 12 also includes a main end tool slide 16 and as seen in FIGURE 1 the machine includes a cross tool slide 18 and others which have not been shown in order to clarify the drawing. FIGURE 4 shows an additional cross slide 19.

Figure 2:
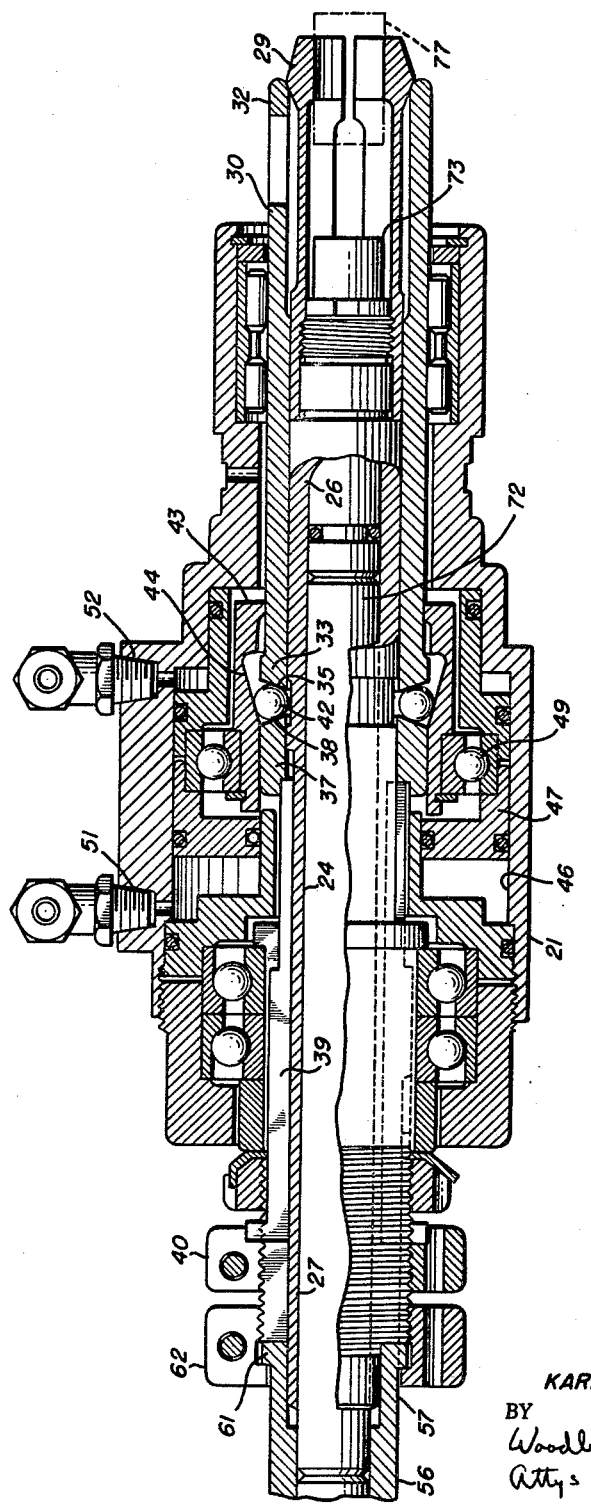
FIGURE 2 is an enlarged side elevational view of the pick off attachment of the present invention in section and with most of the parts of the automatic lathe shown in FIGURE 1 omitted.

The pick off attachment 10 is a chuck assembly, and as best seen in FIGURE 2, includes a housing 21 which is slidably mounted on a dovetail on the main tool slide 16 and adapted for axially parallel movement on this slide 16 between forward and rearward positions. The pick off attachment is shown in its forward position in FIGURE 2. The pick off attachment includes a pick off spindle 24 located within the housing 21 and adapted for rotative movement therein and having first and second end portions 26 and 27 respectively. A collet chuck 29 is located coaxial with the pick off spindle 24 and the rearward end of the collet chuck is threaded to the first end portion 26 of the pick off spindle. A collet sleeve or closer member 30 is located coaxial with the collet chuck 29 and the pick off spindle housing 21 and has a first or forward end portion 32 surrounding at least a portion of the collet chuck and being movable axially relative thereto to open and close the collet chuck. FIGURE 2 illustrates the collet sleeve in its most forward position, with the collet chuck being closed. The spring tension in the fingers of the collet chuck 29 and the conical taper thereon causes movement of the collet sleeve 30 to the left as seen in FIGURE 2 upon axial release of the same which in turn causes opening of the chuck.

The collet sleeve 30 has a rearward or second end 33 which is provided with a plurality of circumferentially spaced and tapered ball or detent receiving grooves 35. A thrust ring 37 sometimes referred to as an abutment surrounds the pick off spindle 24 and is slightly axially spaced from the rearward end 33 of the sleeve 30. The thrust ring 37 is also provided with tapered ball or detent receiving grooves 38 generally corresponding to the grooves 35. The axial position of the thrust ring 37 is maintained by a plurality of keys 39 only one of which has been shown, which in turn is held in position by a nut member 40. A plurality of balls or detents 42 are positioned in the grooves 35 and 38 with one portion of the balls engaging grooves 35 and another portion engaging grooves 38. It will be appreciated that the radial position of the balls 40 in the grooves determines the axial position of the collet sleeve 30.

An axially movable sleeve 43 sometimes referred to as a cam sleeve surrounds the rearward end portion 33 of the collet sleeve 30 and is slidably movable thereon and has a tapered surface 44 which is engageable with the balls 42. The housing 21 is provided with walls 46 which form the surface of a cylinder and an axially movable piston 47 therewithin generally surrounds the sleeve 43. As best seen in FIGURE 2, the connection between the sleeve 43 and the piston 47 is by means of a bearing 49.

This bearing permits rotation of the sleeve 43 relative to the piston, and also transmits the small requirements of axial thrust from the piston to the sleeve. The moving of the collet sleeve is accomplished by what may be referred to as cam means or cam and detent means. Air supply ports 51 and 52 respectively are provided for supplying air to the cylinder 46 on opposite sides of the piston 47 for moving the piston in its back and forth direction. It will be appreciated that one movement of the piston might be accomplished by a spring or other suitable means.

A drive shaft 56, having a first and second end portion 57 and 58 is provided, and bearings 59 serve to rotatively mount this shaft in the machine 12. The first end portion of the drive shaft is provided with a shoulder 61 and is engaged by a shouldered nut 62 which in turn is threadably connected to the second end portion 27 of the pick off spindle 24 to rotatively connect the drive shaft and pick off spindle together.

Figure 3:
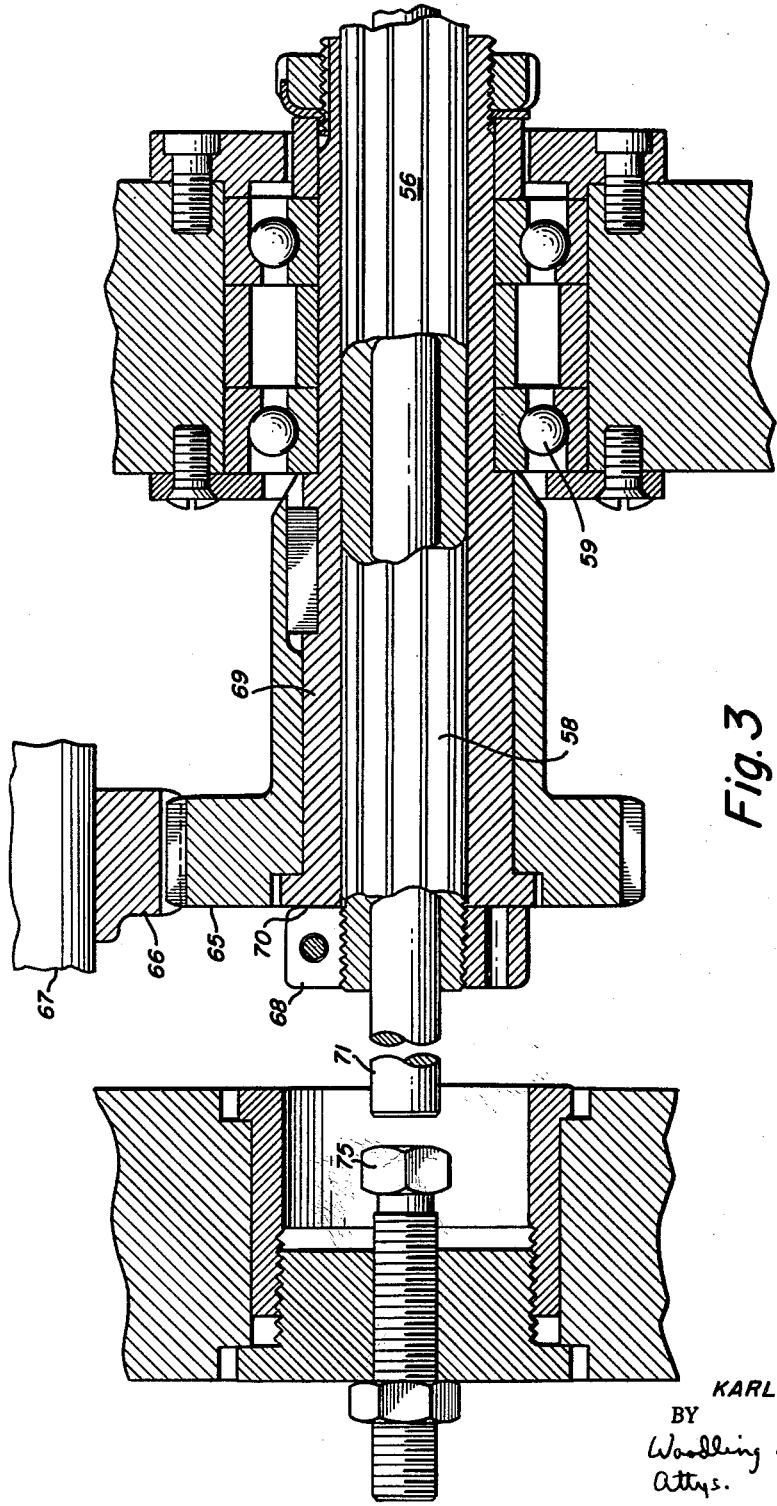
FIGURE 3 is an enlarged side elevational view of the pick off drive system.

A first gear 65 is splined to the second end portion 58 of the drive shaft and is engaged and driven by a second gear 66 in turn driven by a main drive shaft 67 in the machine 12. A stop nut 68 is secured to the second end portion 58 of the drive shaft and is adapted to engage a stop 70, which may be the end of a hub 69 to which the gear 65 is keyed, to limit movement of the pick off attachment to the right or to the position shown in FIGURES 2 and 3.

Ejector rod means are provided for ejecting a workpiece held by the collet chuck 29 when the chuck has been released by the sleeve 30 and the pick off attachment has moved to its rearward position or to the left as seen in FIGURE 2. The ejector rod means includes three rod-like members 71, 72 and 73, respectively, which extend axially through the drive shaft 56 and the pick off spindle 24 into the opening of the collet chuck. An ejector abutment 75 is adjustably mounted in the machine 12 and is adapted to engage the left end of rod 71 upon movement of the attachment to its rearward position which in turn causes the rod 73 to engage a workpiece 77 held by the chuck and push it therefrom.

FIGURE 4 shows generally linkage means connected to the pick off attachment housing 21 for driving it between its various positions. This linkage means includes an arm 79 and a link 80 which is pivotally connected to the arm at 81 and pivotally connected to the housing at 82. An adjustable limit stop 84 is carried by the housing 21 and is adapted to engage a portion of the machine, in this case specifically the tool slide 18, to provide a limit for the forward movement to the right of the attachment 10 as shown in FIGURE 2. The purpose of this limit stop 84 will be described in more detail hereinafter.

FIGURE 4 is a schematic drawing showing generally the control circuit for driving the pick off attachment through its desired movements. This figure shows a control cam drum 86 mechanically connected to the arm 79 by means of connection 87 which serves to drive the pick off attachment in its back and forth movement. A solenoid valve 89 is controlled through a cam operated switch 90 from a voltage source 91. The solenoid valve 89 controls the flow of air from an air source 93 into either the air port 51 or air port 52 which serves to move the piston 47 to the right (FIGURE 2) when air is admitted through port 51 and to the left when air is admitted into port 52.

The operation of the attachment 10 after the machine spindle carrier indexes to a new spindle position is as follows:

The cut off slide 19 indicated by the tool 95 in FIGURE 4 starts to move transversely toward the stock 96 carried by machine spindle 97 in the fifth spindle position and starts to separate the finished workpiece 77 from the remaining bar. At some suitable time, either before cut off starts or after the cut off is approximately 25% completed, the attachment 10 moves axially toward the spindle 97 by means of the cam drum 86 and linkage 87, 79 and 80. Switch 90 is in a position opposite to that shown in FIGURE 4, and thus the collet chuck is maintained in open position during this movement because of air entering the cylinder 46 through port 52. In this condition, the open collet chuck slides over the left end of the workpiece 77 as shown in FIGURE 2 and the movement of the pick off attachment to the right is limited by the stop nut 68 on the left end of the drive shaft 56. At this point in time, the cam operated switch 90 throws the solenoid valve 89 to its other position exhausting air through port 52 and introducing air into the cylinder through port 51. This causes the piston 47 to move to the right, transferring a similar axial movement to the sleeve 43 through bearing 49 which causes the conical tapered surface 44 to urge the detent balls 42 radially inwardly in the grooves 35 and 38. This in turn causes the collet sleeve 30 to move to the right camming the collet chuck into holding engagement with the workpiece 77. During the aforementioned movement of the attachment to the right in closing of the collet chuck, the pick off spindle 24 is rotating with the same speed and direction as the machine spindle 97. This drive is, of course, accomplished from shaft 67, gears 65 and 66, and drive shaft 56. After the collet chuck is closed, the attachment acts as a rotating support until the workpiece is completely cut off, thus establishing a burr-free back face on the workpiece. At the point in time when the workpiece 77 is completely severed from the stock 96, the cam drum 86 through its associated linkage causes the attachment to move to the left far enough to permit clearance for a back finishing tool. This is the position of parts in FIGURE 4. The back finishing tool has been illustrated as a back chamfer tool 99, carried by the tool slide 18 to move into the center line of the pick off attachment. The attachment 10, still with a closed collet chuck, then moves to the right whereat the back chamfer tool 99 performs its machining operation on the rotating workpiece 77 and this movement to the right is limited by the engagement of the limit stop 84 with the tool slide 18. The attachment then moves completely to the left, at which time the cam operated switch 90 causes movement of the valve 89 to the position opposite that shown in FIGURE 4, and air is exhausted from port 51 and introduced into port 52 which in turn causes axial movement of the sleeve 43 to the left, thereby releasing the collet chuck and permitting ejection of the workpiece 77 by engagement of the stop rod member 71 with the ejector abutment 75 and with resultant engagement of the rod-like member 73 with the workpiece. The attachment is then ready for another cycle of operation.

It will thus be seen that according to the description of the structure, operation and result, that the present attachment provides a burr-free cut off of the workpiece from the bar stock and also serves as a holder and drive means for machining operations on the cut off rear face of the workpiece. Because of the compact design of the cylinder and piston arrangement, it is possible to conveniently locate the attachment in the tooling area of the automatic machines with which the device is adapted to operate. The use of the collet chuck and the collet sleeve combination closed by detents acting on the cam surfaces of the collet sleeve provides a convenient and reliable chuck closing mechanism which has long life and is reliable in operation. The mounting and construction of the piston and cylinder arrangement coaxial with the rest of the structure provides a means of exerting the chuck closing force without applying twisting or bending forces to the unit. Also a non-rotating cylinder and piston 47 provides axial force to actuate the rotating collet 29. The entire construction greatly reduces the amount of friction in moving the collet chuck between open and closed positions and the construction also enables a quick and easy connection to or disassembly between the drive shaft 56 and the pick off spindle 24. The providing of the pick off attachment with a generally stationary or non-rotating housing also provides a construction which is highly desirable. It is also possible because of the construction of the present unit to eject completed workpieces axially through the rear of pick off spindle 24 of the unit and through the drive shaft 56 when it is not possible to have front ejection. This is accomplished by removing the rod members 71, 72 and 73 and having the finished workpieces fed through to the left end of the drive shaft 56 and fall into a feed chute or pan at that end.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pick off attachment for a lathe which has a main tool slide,
   including a housing adapted to be mounted by the main tool slide for sliding movement between forward and rearward positions,
   a pick off spindle mounted in said housing for rotative movement and having first and second end portions,
   a chuck coaxial with said pick off spindle,
   a chuck sleeve coaxial with said chuck and having a first end portion surrounding at least a portion of said chuck and movable axially with respect thereto to cause opening and closing of said chuck,
   a plurality of circumferentially spaced ball receiving grooves in a second end portion of said chuck sleeve,
   a ring surrounding said pick off spindle and having ball receiving grooves in one end thereof corresponding to said grooves in said chuck sleeve,
   balls positioned in said grooves,
   an axially movable cam sleeve surrounding said second end end portion of said chuck sleeve and said ring,
   wall means on said cam sleeve defining a tapered surface for engagement with said balls,
   wall means in said housing forming an annular cylinder,
   an axially movable piston in said cylinder and generally surrounding and connected to move said cam sleeve,
   a drive shaft having first and second end portions,
   bearing means rotatively mounting said drive shaft,
   said first end portion of said drive shaft connected to said second end portion of said pick off spindle,
   means for driving said drive shaft,
   a stop secured to said second end portion of said drive shaft to limit forward axial movement of said attachment,
   and means connected to said housing for moving same between said forward and rearward position.

2. A pick off attachment for a multiple spindle lathe which has a main tool slide,
   including a housing adapted to be mounted by the main tool slide for sliding movement between forward and rearward positions,
   a pick off spindle mounted in said housing for rotative movement and having first and second end portions,
   a chuck coaxial with said pick off spindle,
   a chuck sleeve coaxial with said chuck and having a first end portion surrounding at least a portion of said chuck and movable axially with respect thereto to cause opening and closing of said chuck,
   a plurality of circumferentially spaced and tapered ball receiving grooves in a second end portion of said chuck sleeve,
   a thrust ring surrounding said pick off spindle and having tapered ball receiving grooves in one end thereof corresponding to said grooves in said chuck sleeve,
   balls positioned in said grooves,
   an axially movable cam sleeve surrounding said second end portion of said chuck sleeve and said thrust ring,
   wall means on said cam sleeve defining a tapered surface for engagement with said balls,
   wall means in said housing forming an annular cylinder,
   an axially movable piston in said cylinder and generally surrounding and connected to move said cam sleeve,
   a drive shaft having first and second end portions,
   bearing means rotatably mounting said drive shaft,
   said first end portion of said drive shaft having a shoulder thereon,
   a shouldered nut engaging said drive shaft shoulder and being connected to said second end portion of said pick off spindle to connect said drive shaft and pick off spindle together,
   gear means at said second end portion of said drive shaft for driving the same,
   a stop secured to said second end portion of said drive shaft and adapted to limit forward axial movement of said attachment,
   ejector rod means extending axially through said drive shaft and said pick off spindle and into said chuck for ejecting workpieces held by said chuck,
   an ejector abutment for engagement with said ejector rod means to move same upon movement of said housing to its rearward position,
   means connected to said housing for moving same between said forward and rearward position,
   and a limit stop carried by said housing for engagement with a portion of said lathe to limit forward movement of said attachment.

3. A pick off attachment for a multiple spindle lathe which has a main tool slide,
   including a housing adapted to be mounted by the main tool slide for sliding movement between forward and rearward positions,
   a pick off spindle mounted in said housing for rotative movement and having first and second end portions,
   a collet chuck coaxial with said pick off spindle,
   a collet sleeve coaxial with said collet chuck and having a first end portion surrounding at least a portion of said collet chuck and movable axially with respect thereto to cause opening and closing of said collet chuck,
   a plurality of circumferentially spaced and tapered ball receiving grooves in a second end portion of said collet sleeve,
   a thrust ring surrounding said pick off spindle and having tapered ball receiving grooves in one end thereof corresponding to said grooves in said collet sleeve,
   balls positioned in said grooves,
   a key having one end portion engaging said thrust ring and extending axially from said housing and engaging a nut secured to said second end portion of said pick off spindle,
   an axially movable sleeve surrounding said second end portion of said collet sleeve and said thrust ring,
   wall means on said axially movable sleeve defining a tapered surface for engagement with said balls,
   wall means in said housing forming an annular cylinder,
   an axially movable piston in said cylinder and generally surrounding said axially movable sleeve,
   a bearing connecting said piston to said axially movable sleeve whereby same move axially together while permitting rotation of said axially movable sleeve,
   air ports providing for the introduction of air into said cylinder on opposite sides of said piston,
   a drive shaft having first and second end portions,
   bearing means rotatively mounting said drive shaft,
   said first end portion of said drive shaft having a shoulder thereon,
   a shouldered nut engaging said drive shaft shoulder and being connected to said second end portion of said pick off spindle to connect said drive shaft and pick off spindle together, a first gear secured to said second end portion of said drive shaft for rotation therewith and permitting relative movement of said drive shaft, a second gear engaging said first gear for driving same from a main drive shaft, a stop nut secured to said second end portion of said drive shaft and adapted to engage a stop to limit forward axial movement of said attachment, ejector rod means extending axially through said drive shaft and said pick off spindle and into said collet chuck for ejecting workpieces held by said collet chuck, an ejector abutment for engagement with said ejector rod means to move same upon movement of said housing to its rearward position, linkage means connected to said housing for moving same between said forward and rearward position, and a limit stop carried by said housing for engagement with a portion of said lathe to limit forward movement of said attachment.

4. A pickoff attachment including a housing,
a pickoff spindle mounted in said housing for rotative movement,
a chuck coaxial with said pickoff spindle,
a chuck sleeve coaxial with said chuck and movable axially with respect thereto to cause opening and closing of said chuck,
one end of said chuck sleeve surrounding said pickoff spindle,
a plurality of circumferentially spaced detent receiving radially tapered grooves in said one end of said chuck sleeve,
detents positioned in said grooves,
an axially movable cam sleeve surrounding said chuck sleeve and said detents and axially slidable on said chuck sleeve,
axially tapered wall means on one of said cam sleeve and said detents,
wall means in said housing forming an annular cylinder,
and an axially movable piston in said cylinder and generally surrounding and connected to move said cam sleeve.

5. A pickoff attachment including a housing,
a pickoff spindle mounted in said housing for rotative movement,
a chuck coaxial with said pickoff spindle,
a chuck sleeve coaxial with said chuck and having a first end portion surrounding at least a portion of said chuck and movable axially with respect thereto to cause opening and closing of said chuck,
a second end portion of said chuck sleeve surrounding said pickoff spindle,
a plurality of circumferentially spaced detent receiving grooves in said second end portion of said chuck sleeve,
detents positioned in said grooves,
at least one of said grooves and detents being radially tapered,
an axially movable cam sleeve surrounding said second end portion of said chuck sleeve and axially slidable on said second end portion of said chuck sleeve,
wall means on said cam sleeve defining a tapered surface for engagement with said detents,
wall means in said housing forming an annular cylinder,
and an axially movable piston in said cylinder and generally surrounding and connected to axially move said cam sleeve.

6. A pickoff attachment including a housing,
a pickoff spindle mounted in said housing for rotative movement, a chuck coaxial with said pickoff spindle,
a chuck sleeve coaxial with said chuck and having a first end portion surrounding at least a portion of said chuck and movable axially with respect thereto to cause opening and closing of said chuck,
a second end portion on said chuck sleeve surrounding said pickoff spindle,
a plurality of circumferentially spaced ball receiving first grooves in said second end portion of said chuck sleeve,
a ring surrounding said pickoff spindle and having ball receiving second grooves in one end thereof corresponding to said grooves in said chuck sleeve,
at least one of said first and second grooves being radially tapered,
balls positioned in said grooves,
an axially movable cam sleeve surrounding said second end portion of said chuck sleeve and said ring,
wall means on said cam sleeve defining a tapered surface for engagement with said balls,
wall means in said housing forming an annular cylinder,
and an axially movable piston in said cylinder and generally surrounding and connected to move said cam sleeve.

7. A pickoff attachment for a lathe which has a main tool slide including a housing adapted to be mounted by the main tool slide for sliding movement between forward and rearward positions,
a pickoff spindle mounted in said housing for rotative movement and having first and second end portions,
a chuck coaxial with said pickoff spindle,
a chuck sleeve coaxial with said chuck and movable axially with respect thereto to cause opening and closing of said chuck,
a plurality of circumferentially spaced detent receiving radially tapered grooves in said chuck sleeve,
detents positioned in said grooves,
an axially movable cam sleeve surrounding said chuck sleeve and said detents,
axially tapered wall means on one of said cam sleeve and said detents,
wall means in said housing forming an annular cylinder,
an axially movable piston in said cylinder and generally surrounding and connected to move said cam sleeve,
a drive shaft having first and second end portions,
bearing means rotatively mounting said drive shaft,
said first end portion of said drive shaft connected to said second end portion of said pickup spindle,
means for driving said drive shaft,
a stop secured to said drive shaft to limit forward axial movement of said attachment,
and means connected to said housing for moving same between said forward and rearward position.

8. A pickoff attachment including a housing,
a pickoff spindle mounted in said housing for rotative movement,
a chuck coaxial with said pickoff spindle,
a chuck sleeve coaxial with said chuck and having a first end portion surrounding at least a portion of said chuck and movable axially with respect thereto to cause opening and closing of said chuck,
a second end portion on said chuck sleeve surrounding said pickoff spindle,
a plurality of circumferentially spaced ball receiving radially tapered grooves in said second end portion of said chuck sleeve,
a ring surrounding said pickoff spindle and having ball receiving radially tapered grooves in one end thereof corresponding to said grooves in said chuck sleeve,
balls positioned in said grooves,
an axially movable cam sleeve surrounding said second end portion of said chuck sleeve and said ring, wall means on said cam sleeve defining an axially tapered surface for engagement with said balls,
wall means in said housing forming an annular cylinder, and an axially movable piston in said cylinder and generally surrounding and connected to move said cam sleeve.

References Cited by the Examiner

UNITED STATES PATENTS

| | | | |
|---|---|---|---|
| 2,061,417 | 11/36 | Drissner et al. | 29—37 |
| 2,326,541 | 8/43 | Kuehn | 82—2.5 X |
| 2,906,540 | 9/59 | Butterworth et al. | 279—4 |
| 2,989,316 | 6/61 | Perry et al. | 279—50 |

FOREIGN PATENTS

| | | |
|---|---|---|
| 391,295 | 4/33 | Great Britain. |

WILLIAM W. DYER, JR., *Primary Examiner.*